United States Patent [19]

Soroushian et al.

[11] Patent Number: 5,935,317
[45] Date of Patent: Aug. 10, 1999

[54] ACCELERATED CURING OF CEMENT-BASED MATERIALS

[75] Inventors: Parviz Soroushian; Jer-Wen Hsu, both of Okemos, Mich.

[73] Assignee: DPD, Inc., Lansing, Mich.

[21] Appl. No.: 08/947,909

[22] Filed: Oct. 9, 1997

Related U.S. Application Data

[63] Continuation of application No. 08/510,264, Aug. 2, 1995, abandoned.

[51] Int. Cl.$^6$ .................................................. C04B 22/10
[52] U.S. Cl. ................. 106/723; 106/819; 264/DIG. 43
[58] Field of Search .................... 264/DIG. 43; 106/682, 106/723, 740, 819

[56] References Cited

U.S. PATENT DOCUMENTS

| | | |
|---|---|---|
| 109,669 | 11/1870 | Rowland . |
| 128,980 | 7/1872 | Rowland . |
| 2,496,895 | 2/1950 | Staley . |
| 3,149,986 | 9/1964 | Zelmanoff ............................ 106/119 |
| 3,468,993 | 9/1969 | Bierlic ................................... 264/82 |
| 3,492,385 | 1/1970 | Simunic ................................ 264/82 |
| 3,880,664 | 4/1975 | Schulze ................................ 106/703 |
| 4,093,690 | 6/1978 | Murray .................................. 264/82 |
| 4,266,921 | 5/1981 | Murray .................................. 264/82 |
| 4,362,679 | 12/1982 | Malinowski ........................... 264/82 |
| 4,398,960 | 8/1983 | Murray ................................ 106/738 |
| 4,427,610 | 1/1984 | Murray .................................. 264/82 |
| 4,436,498 | 3/1984 | Murray .................................. 264/82 |
| 4,772,439 | 9/1988 | Trevino-Gonzalez ........... 264/DIG. 43 |
| 5,518,540 | 5/1996 | Jones, Jr. ............................. 106/638 |

FOREIGN PATENT DOCUMENTS

| | | |
|---|---|---|
| 1915563 | 3/1969 | Germany . |
| 2008247 | 2/1970 | Germany . |
| 6-92700 | 4/1994 | Japan . |
| 781328 | 8/1957 | United Kingdom . |
| 1460284 | 12/1976 | United Kingdom . |

OTHER PUBLICATIONS

Concrete Technology and Practice, Taylor (1966) pp. 179–180.

*Primary Examiner*—Paul Marcantoni

[57] ABSTRACT

A $CO_2$ pre-curing period is used prior to accelerated (steam or high-pressure steam) curing of cement and concrete products in order to: (1) prepare the products to withstand the high temperature and vapor pressure in the accelerated curing environment without microcracking and damage; and (2) incorporate the advantages of carbonation reactions in terms of dimensional stability, chemical stability, increased strength and hardness, and improved abrasion resistance into cement and concrete products without substantially modifying the conventional procedures of accelerated curing. Depending on the moisture content of the product, the invention may accomplish $CO_2$ pre-curing by first drying the product (e.g. at slightly elevated temperature) and then expose it to a carbon dioxide-rich environment. Vigorous reactions of cement paste in the presence of carbon dioxide provide the products with enhanced strength, integrity and chemical and dimensional stability in a relatively short time period. Subsequent accelerated curing, even at reduced time periods (with less energy and cost consumptions) would produce higher performance characteristics than achievable with the conventional pre-setting period followed by accelerated curing of cement and concrete products.

14 Claims, 3 Drawing Sheets

ACCELERATED CURING OF CEMENT-BASED MATERIALS

CROSS REFERENCES TO RELATED APPLICATIONS

This application is a continuation of Ser. No. 08/510,264 filed Aug. 2, 1995, now abandoned.

BACKGROUND—FIELD OF INVENTION

This invention relates to cement, concrete and concrete-like products, especially those subjected to accelerated curing for rapid strength gain and dimensional stabilization.

BACKGROUND—DESCRIPTION OF PRIOR ART

The slow rate of setting and hardening of hydraulic cements reduce productivity in cement and concrete products plants. To overcome this problem, accelerated curing processes have been adopted by the cement and concrete products industry where methods such as steam and high-pressure steam curing have been used to increase the rate of strength gain and dimensional stabilization in cement-based materials. These accelerated curing processes subject the product to an environment with elevated temperature and (possibly) pressure. A pre-set period is required to prevent damage to the young product in such environments due to stresses associated with thermal expansion and vapor pressure. The pre-set period also allows the occurrence of chemical reactions which are needed for eventual chemical and dimensional stability of the system. Our invention utilizes $CO_2$ curing within this pre-set period in order to uniquely prepare cement- and concrete-based products for conventional accelerated curing processes, and also to bring about improvements in the final product after curing.

$CO_2$ curing has been the subject of several patents which have used the process as a replacement for conventional accelerated curing processes such as steam or accelerated steam curing. The prior art does not, however, cover complementary and subsequent use of $CO_2$ curing and conventional accelerated curing processes.

U.S. Pat. No. 109,669 to James L. Rowland (Nov. 29, 1870), U.S. Pat. No. 128,980 to James L. Rowland (Jul. 16, 1972), U.S. Pat. No. 2,496,895 to Ronald W. Staley (Feb. 7, 1950), U.S. Pat. No. 3,149,986 to Nissan Zelmanoff (Sep. 22, 1964), U.S. Pat. No. 3,468,993 to Knud Georg Bierlich (Sep. 23, 1969), U.S. Pat. No. 3,492,385 to Branko Simunic (Jan. 27, 1970), U.S. Pat. No. 4,093,690 to John A. Murray (Jun. 6, 1978), U.S. Pat. No. 4,266,921 to John A. Murray (May 12, 1981), U.S. Pat. No. 4,362,679 to Roman Malinowski (Dec. 7, 1982), U.S. Pat. No. 4,427,610 to John A. Murray (Jan. 24, 1984), U.S. Pat. No. 4,436,498 to John A. Murray (Mar. 13, 1984), U.S. Pat. No. 5,257,464 to Francisco Trevino-Gonzales (Nov. 2, 1993), German lay-open print 1,915,563 (1974), German open-to-public print 2,008,247 (1971), United Kingdom patent 781,328 (1957), United Kingdom patent 1,460,284 (1976), and Swedish patent 89,121 to K. P. Billner (1935) cover various methods of accelerated curing of concrete with carbon dioxide. These inventions use various concrete mixtures which are relatively dry or are dewatered to a relatively low moisture content, and are then subjected to carbon dioxide gas at atmoshpheric or elevated pressaures in environments with different temperatures and relative humidities. They present carbonation curing as an alternative to, and not a complement for, the conventional accelerated curing methods of steam and high-pressure steam curing. They rely on carbonation to reach substantial stages of curing.

OBJECTS AND ADVANTAGES

Accordingly, several objects and advantages of my invention are to incorporate the $CO_2$ curing process into the pre-set period of the conventional accelerated curing methods of cement and concrete products in order to make them more capable of withstanding the elevated temperature and pressure of the accelerated curing prcesses, to incorporate the advantages of $CO_2$ curing in terms of improved dimensional stability, increased impermeability and strength, and enhanced chemical stability, longevity, abrasion resistance, efflorescence resistance and hardness, and enhanced compatibility of the cement-based matrix with inclusions such as glass and wood fibers into concrete and cement products, and to reduce the time and energy required for accelerated curing of concrete and cement products.

Still further objects and advantages will become apparent from a consideration of the ensuing description and accompanying drawings.

SUMMARY

A method of accelerated curing of cement and concrete products where a $CO_2$ pre-curing period precedes the conventional accelerated curing processes such as steam and high-pressure steam curing. The $CO_2$ pre-curing step involves the adjustment of the moisture content of the product as necessary, for example through drying, followed by exposure of the product to a carbon dioxide-rich environment at different temperatures and relative humidities. Exposure to carbon dioxide causes vigorous reactions with cement paste which produce desirable levels of strength and integrity for the product to satisfactorily withstand the high temperatures and pressures involved in conventional accelerated curing procedures without microcracking and damage, and to provide the product with the advantages of carbonation reactions in terms of improved dimensional stability, chemical stability and mechanical properties. The process also presents the potential to reduce the time and energy consumption in accelerated curing of cement and concrete products, and provides a value-added application for industrial emissions which are typically rich in carbon dioxide.

PREFERRED EMBODIMENT—DESCRIPTION

Figure 1:
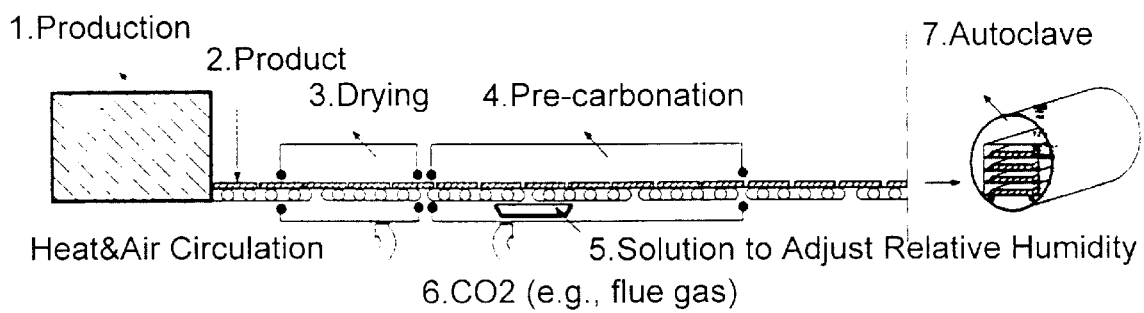
FIG. 1 is a schematic presentation of the application of the invention for the production of fibrous cement panels. Following the adjustment of moisture content in a heated environment, the panels are exposed to carbon dioxide at controlled humidity and then moved to an autoclave for high-pressure steam curing.

As shown in FIG. 1, the invention can be used in pre-carbonation of cement or concrete products prior to high-pressure steam curing in an autoclave. Following production (by molding, slurry-dewatering, or other techniques) in the production unit 1, the product 2 is subjected to a drying environment 3 where heat, air circulation and/or low humidity of the environment are used to reduce the moisture content of the product to levels which favor the diffusion and reaction of carbon dioxide. Subsequently, the products with adjusted moisture content enter the pre-carbonation environment where the moisture content may be maintained at a desirable level usng a solution 5, through which carbon dioxide or carbon dioxide-rich gases (e.g. flue gas) 6 are introduced into the environment. The pre-carbonated products are then moved into an autoclave 7 for high-pressure steam curing. The variables of high-pressure steam curing may be adjusted because of the pre-carbonation of the products. For example, the temperature can be raised more rapidly and the duration of high-pressure steam curing may be reduced.

Figure 2:
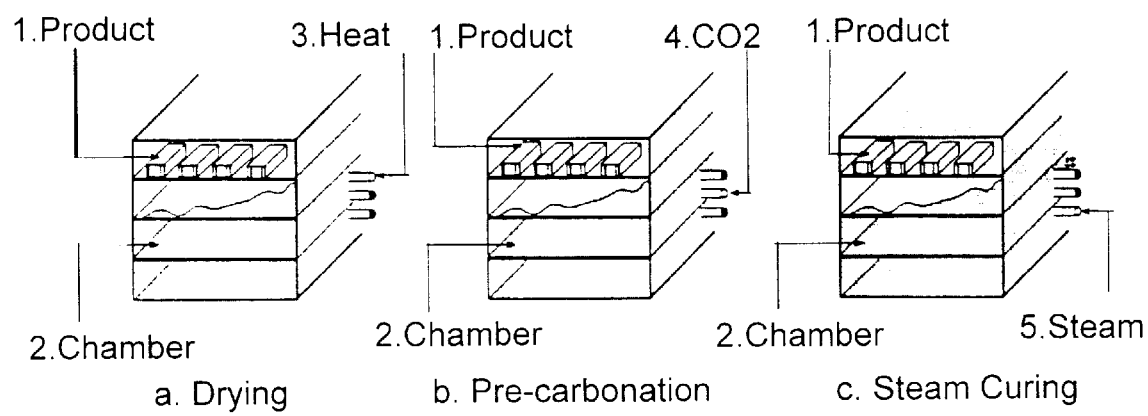
FIG. 2 shows the application of our invention in concrete masonry production. The masonry units are first dried in a chamber to desired moisture content and then exposed to carbon dioxide at appropriate relative humidity for pre-curing. They are subsequently subjected to steam curing in the chamber.

In FIG. 2, concrete products (masonry units, pipes, etc.) 1 are subjected to drying (FIG. 2a), carbonation (FIG. 2b) and steam curing (FIG. 2c) within the same chamber 2. Drying (FIG. 2a) is accomplished by the applicaiton of heat 3 in the chamber (possibly with air circulation); some low-moisture-content products may not need any drying. Subsequently, carbon dioxide or carbon dioxide-rich gases (e.g. flue gas) 4 are introduced into the camber for a sufficient time period to accomplish pre-carbonation. The chamber is then loaded with steam 5 at an appropriate temperature for steam curing of the concrete products. The steam curing variables (rate of temperature rise, duration, etc.) can be adjusted (e.g. duration can be reduced) due to pre-carbonation.

Figure 3:
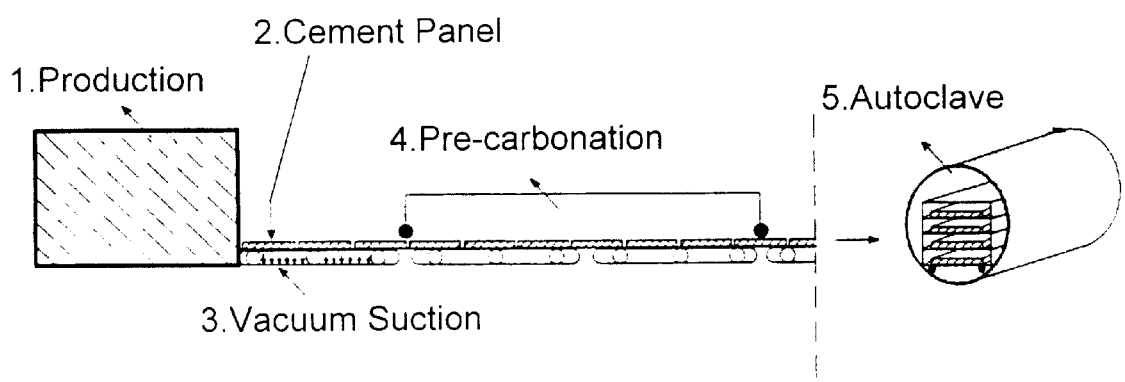
FIG. 3 shows an application of the invention in a production unit similar to that shown in FIG. 1, except that the drying process for the adjustment of moisture content prior to pre-carbonation is accomplished through vacuum-dewatering.

As shown in FIG. 3, in applications similar to that in FIG. 1, the concrete products (e.g. cement or fibrous cement panel) 2 can be dried through the application of vacuum 3. Subsequently, the product would be pre-carbonated 4 and loaded into autoclave 5 for high-pressure steam curing.

PREFERRED EMBODIMENT—OPERATION

The operation of the system incorporating our pre-carbonation procedure is further described here with reference to FIGS. 1, 2 and 3. In order to accomplish pre-carbonation prior to accelerated (e.g. steam or high-pressure steam) curing of cement and concrete products, the relatively wet products have to be partially dried; some direr products may not require this adjustment of moisture content, and some very dry products may actually need the introduction of some additional moisture. In FIGS. 1 and 2, drying is accomplished at elevated temperature (in the drying environment 3 of FIG. 1 and through the application of heat 3 into the chamber 2 in FIG. 2). In FIG. 3, vacuum-dewatering 3 is used to accomplish drying. Alternatively, one could store the products in environments with relatively low relative humidity, with or without the introduction of heat, in order to adjust their moisture content. In either case, particularly when heat is used for the purpose of drying, exccessively high temperatures can be damaging to the product. The reason for the adjustment of the product moisture content is that high moisture contents mitigate thorough penetration of the carbon dioxide gas into the product and thus prevent effective carbonation. Low moisture contents also do not favor the process of carbonation where the carbon dioxide gas should be dissolved in water to react with cement. Once the moisute content is adjusted, the products are exposed to carbon dioxide or carbon dioxide-rich gases in order to achieve pre-carbonation. In FIG. 1, the carbon dioxide gas 6 is introduced through a solution 5 which adjusts the moisture content of the pre-carbonation environment and the relative humidity of the gas. Again, very low or very high moisture contents and relative humidities may slow down the rate of carbonation. In FIG. 2, pre-carbonation is accomplished through the introductin of the carbon dioxide gas 4 (FIG. 2b) into the same chamber 2 which was used for drying of products (FIG. 2a) and will subsequently be used for steam curing (FIG. 2c). The relative humidity of the environment and the gas may have to be adjusted for optimum pre-carbonation. The duration of the pre-carbonation step depends on a number of factors, including the concentration of $CO_2$, the thickness and composition of the product, the temperature and relative humidity of the pre-carbonation environment, the characterisitcs of the follow-on accelerated curing process, and the targeted properties of the product after accelerated curing. During the pre-carbonation process, $CO_2$ dissolves in the moisute within the pores in the product, and initiates a vigorous reaction with cement, which takes place at a substantially higher rate than conventional hydration of cement and rapidly yields dimensionally and chemically stable hydration and carbonation products which provide high levels of strength and stability. After the precarbonation process, the products are subjected to accelerated curing, which could be, for example, high-pressure steam curing in an autoclave 7 (FIG. 1) or steam curing in a chamber 2 (FIG. 2c). The pre-carbonation process provides the product with sufficient strength and stability to withstand the elevated temperature of such accelerated curing processes without suffering much damage and microcracking. Furthermore, the chemical changes associated with pre-carbonation favor the development of an improved structure within cement-based materials. One may enhance the effects of pre-carbonation through the adjustment of the composition of the product. For example, moisture content may be recduced, and lime, ground limestone, or other products promoting carbonation and bonding with carbonation products may be included in the composition of the cement-based product.

CONCLUSIONS, RAMIFICATIONS, AND SCOPE

Accordingly, it can be seen that we have developed a pre-curing (pre-carbonation) method which efficiently prepares cement and concrete products for accelerated (steam and high-pressure steam) curing, and enhances the end product performance characteristics. Our new method combines, in a complementary manner, the $CO_2$ curing with the conventional methods of accelerated curing of cement and concrete products. The method makes limited changes in the conventional methods of accelerated curing of cement and concrete products, and can thus be conveniently into the production scheme of the existing cement and concrete prducts plants.

Although the description above contains many specificities, these should not be construed as limiting the scope of the invention but as merely providing illustrations of some of the presently preferred embodiments of this invention. Various other embodiments and ramifications are possible within it's scope. For example, the pre-carbonation my not have to be preceded by a drying period if the product is produced at a desirable moisture content. The terms cement and concrete are used here in a general sense. All calcareus and other hydraulic binders capable of recating with $CO_2$ can constitute the binding material in cement and concrete products processed according to this invention. Exposure to the carbon dioxide gas for the purpose of pre-carbonation in this invention may take place under pressure and at different temperatures. Alternatively, vacuum may be applied to create a sub-pressure which is maintained to facilitate the dffusion of the carbon dioxide gas. The carbon dioxide gas may also be replaced with a solusion of $CO_2$ or carbonic acid which is used during mixing or applied to cement or concrete products after molding for the purpose of pre-carbonation. The invention is applicable to cement and concrete products of different geometries and sizes, processed through diverse production techniques, including those utilizing relatively dry or wet mixes, those compacting the material through vibration or under pressure, those using vacuum-dewatering, injection molding, extrusion, conventional molding, and all other methods of making cement and concrete products. The accelerated curing methods following pre carbonation also can be any applicable method other than steam and high-pressure steam curing, including immersion in hot water, and other methods. The invention may also be used in application to cement or concrete products with inclusions such as glass or wood fibers where carbonation reactions make the cement-based matrix more compatible with such fibers and inclusions.

Thus the scope of the invention should be determined by the appended claims and their legal equivalents, rather than by the examples given.

EXAMPLE 1

A normal-weight concrete masonry mix was prepared with a coarse aggregate (pea gravel)-ro-cement ratio (by weight) of 2.1, fine aggregate (concrete river sand)-to-cement ratio of 3.57, and water-to-cement ratio of 0.5. The mix was consolidated through vibration under slight pressure (as is customary in the production of concrete masonry units) into 50-mm cubes. The control pre-set condition consisted of two hours of storage at 30 degrees centigrade and 65% relative humidity. For the purpose of $CO_2$ pre-curing, this pre-set period was replaced with one hour of drying at 30 degrees centigrade and 50% relative humidity, followed by one hour of exposure to an exhaust gas with approximately 20% $CO_2$ concentration at 35 degrees centigrade and 60% relative humidity. In both cases, the products, subsequent to the pre-set period or $CO_2$ pre-curing, were subjected to 4 hours of steam curing at 50 degrees centigrade and 100% relative humidity. The cubes were then stored in laboratory air and subjected to compression tesing at the age of 24 hours. With $CO_2$ pre-curing the compressive strength was more than 55 MPa, while with conventional pre-setting, the compressive strength was of the order of 40 MPa.

EXAMPLE 2

Cellulose fiber reinforced cement composites were prepared in the form of 10-mm panels with 8% fiber mass fracion and silica sand-cement ratio of 0.75 through a slurry-dewatering manufacturing procedure which simulated the Hatscheck process. The conventional pre-set period in this case consisted of storage in an oven at 50 degrees centigrade for 2 hours. For the purpose of $CO_2$ pre-curing, this pre-set period was replaced with 1 hour of oven storage at 50 degrees centigrade followed by 1 hour of exposure to an environment with 20% $CO_2$ concentration and 90% relative humidity. All panels were subsequently subjected to high-pressure steam curing at 150 degrees centigrade for seven hours. The panels were subjected to flexure test and moisture movement (as relative humidity increased from 30% to 90%) test at the age of 14 days. Conventional pre-setting produced a flexural strength of 8 MPa and a moisture movement of 0.07%, while $CO_2$ pre-curing produced a flexural strength of 11 MPa and a moisture movement of 0.04%.

What is claimed is:

1. A method of accelerated curing of cement and concrete products where the products comprise a calcareous cementitious binder, aggregate and water, which have been mixed, formed, consolidated and finished, the method comprising the steps of: partial drying of the products; subjecting the products to a $CO_2$ precuring; and subjecting the pre-cured products to an accelerated curing process where temperatures exceeding the room temperature are used in the presence of moisture to hasten the hydration process of cement; said $CO_2$ pre-curing step involves exposing the products to an environment with a $CO_2$ gas concentration exceeding the atmospheric $CO_2$ concentration.

2. A method of accelerated curing of cement and concrete products according to claim 1, wherein the partial drying step involves subjecting the products to environments with combinations of temperature and humidity which cause evaporation of moisture from such products.

3. A method of accelerated curing of cement and concrete products according to claim 1, wherein the partial drying step involves subjecting the products to vacuum at sub-atmospheric pressure.

4. A method of accelerated curing of cement and concrete products according to claim 1, wherein the $CO_2$ pre-curing environment comprises a blend of air and $CO_2$, with $CO_2$ concentration exceeding atmospheric $CO_2$ concentration.

5. A method of accelerated curing of cement and concrete products according to claim 1, wherein the $CO_2$ pre-curing environment comprises gases derived from combustion emissions with a $CO_2$ concentration exceeding the atmospheric $CO_2$ concentration.

6. A method of accelerated curing of cement and concrete products according to claim 1, wherein the aggregates in the products consists of fine aggregate of at least one of mineral and organic sources.

7. A method of accelerated curing of cement and concrete products according to claim 1, wherein the aggregates in the products comprise fine and coarse aggregates of at least one of mineral and organic sources.

8. A method of accelerated curing of cement and concrete products according to claim 1, wherein the calcareous cementitious binder in the product comprises at least one of the following types: Portland cement, blended Portland cement, rapid setting and hardening cement, and expansive cement.

9. A method of accelerated curing of cement and concrete products according to claim 1, further including a step of adding lime to the products.

10. A method of accelerated curing of cement and concrete products according to claim 1, wherein the products also contain admixtures for the enhancement of the end product performance, the admixtures comprising at least on of pozzolans, air-entraining agents, retarders, set accelerators, and plasticizers.

11. A method of accelerated curing of cement and concrete products according to claim 1, wherein the products also contain discrete reinforcing fibers of at least one of organic, glass and steel materials.

12. A method of accelerated curing of cement and concrete products according to claim 1, wherein the products also contain continuous reinforcement in the form of at least one of organic, glass and composite networks, welded wire fabric, and reinforcing bars.

13. A method of accelerated curing of cement and concrete products according to claim 1, wherein the accelerated curing step comprises steam curing at atmospheric pressure.

14. A method of accelerated curing of cement and concrete products according to claim 1, wherein the accelerated curing step comprises high-pressure steam curing at a pressure exceeding atmospheric pressure.

* * * * *